United States Patent [19]
Waters et al.

[11] Patent Number: 5,714,090
[45] Date of Patent: Feb. 3, 1998

[54] SOLVENT RESISTANT NON-FORMALDEHYDE THERMOSET FLUORESCENT PIGMENT

[75] Inventors: John F. Waters, Lakewood; Wayne R. Likavec, Cleveland; Thomas C. Dipietro, Medina, all of Ohio

[73] Assignee: Day-Glo Color Corporation, Cleveland, Ohio

[21] Appl. No.: 649,129

[22] Filed: May 14, 1996

[51] Int. Cl.$^6$ .................................................. C09K 11/02
[52] U.S. Cl. .................. 252/301.35; 524/606; 524/845
[58] Field of Search .................. 252/301.35; 524/606, 524/845

[56] References Cited

U.S. PATENT DOCUMENTS

| | | | |
|---|---|---|---|
| 3,945,980 | 3/1976 | Tsubakimoto et al. | 260/39 P |
| 4,975,220 | 12/1990 | Streitel et al. | 252/301.35 |
| 5,094,777 | 3/1992 | DiPietro | 252/301.35 |
| 5,236,621 | 8/1993 | DiPietro | 252/301.35 |
| 5,264,153 | 11/1993 | De Krom | 252/301.35 |

*Primary Examiner*—Melissa Bonner
*Attorney, Agent, or Firm*—Calfee, Halter & Griswold LLP

[57] ABSTRACT

The present invention provides a novel, non-formaldehyde thermoset fluorescent pigment which is useful to color plastics, particularly flexible vinyl, which is solvent resistant, particularly to acetone. Moreover, the pigment does not bleed in plastics. The pigment comprises a polymer matrix and a fluorescent dye. The polymer matrix has a molecular weight of greater than about 330, preferably greater than about 1000. Embodiments which lack the water insoluble resin, have a molecular weight greater than about 330, preferably greater than about 500. The polymer matrix contains: from about 15 to 50 mole percent, preferably 30 to 40 mole percent, of a carboxylate functional oligomer; 30 to 80 mole percent, preferably 50 to 60 mole percent, of a metal ion; and 0 to 40 mole percent, preferably about 1 to 40 mole percent, more preferably from 1 to 30 mole percent, most preferably from about 3 to 10 mole percent of a water insoluble resin. In embodiments where no water insoluble resin is used, the metal is present from at least 51 mole percent. The oligomer comprises from about 10 to about 60 mole percent, preferably 20 to 35 mole percent of a first monomer, 40 to 90 mole percent, preferably 65 to 80 mole percent of second monomer. The weight average molecular weight of the oligomer is 330 to 2000, preferably about 560 to 600. The invention also relates to a novel method for producing the fluorescent pigments.

27 Claims, No Drawings

SOLVENT RESISTANT NON-FORMALDEHYDE THERMOSET FLUORESCENT PIGMENT

BACKGROUND OF THE INVENTION

Several different types of fluorescent pigments are currently used for coloring flexible vinyl. One type is a thermoplastic pigment in which the pigment itself melts then dissolves and releases dye into the vinyl. Unfortunately, plastics colored with such soluble fluorescent pigment exhibit severe color migration and such, and often stick to equipment during processing.

Thermoset fluorescent pigments for coloring flexible vinyl include a toluene-sulfonamide-melamine pigment and a benzogaunamine pigment. The TSA melamine pigments, while they do not melt, migrate color when processed in vinyl. The benzoguanamine pigments are typically made in dispersion. Dispersion technique makes it difficult to efficiently produce pigment in bulk; yields are typically about 30% solids. Furthermore the pigment needs to be filtered, dried, and pulverized. The multiple steps are time consuming and costly. In addition, benzoguanamine is a relatively expensive raw material.

Furthermore, both the toluene/sulfonamide/melamine and a benzogaunamine pigment contain formaldehyde, which is not environmentally friendly and is released when the plastic is heated.

Other conventional fluorescent pigments are not suitable substitutes for the benzoguanamine/formaldehyde based pigments because of the tendency of such pigments to melt into the plastic and consequently bleed dye. Also when conventional pigments are exposed to solvents such as acetone the pigments tend to dissolve and to bleed dye into the plastic.

It is desirable to have a fluorescent pigment which does not bleed dye in flexible vinyl, does not contain formaldehyde, and resists solvents, particularly acetone. In addition, it would be desirable to be able to prepare such a pigment in a bulk process with yields above 30%.

SUMMARY OF THE INVENTION

The present invention provides a novel, non-formaldehyde thermoset fluorescent pigment which is useful to color plastics, particularly flexible vinyl, which is solvent resistant, particularly to acetone. Moreover, the pigment does not bleed in plastics. The pigment comprises from about 85 to 99.95 weight percent of a polymer matrix and a fluorescent dye. The polymer matrix has a molecular weight of greater than about 330, preferably greater than about 1000. Embodiments which lack the water insoluble resin, have a molecular weight greater than about 330, preferably greater than about 500. The polymer matrix contains: from about 15 to 50 mole percent, preferably 30 to 40 mole percent, of a carboxylate functional oligomer, also referred to herein as the "oligomer,"; 30 to 80 mole percent, preferably 50 to 60 mole percent, of a metal ion; and 0 to 40 mole percent, preferably about 1 to 40 mole percent, more preferably from 1 to 30 mole percent, most preferably from about 3 to 10 mole percent of a water insoluble resin. In embodiments where no water insoluble resin is used, the metal is present from at least 51 mole percent.

The oligomer comprises from about 10 to about 60 mole percent, preferably 20 to 35 mole percent of a first monomer, 40 to 90 mole percent, preferably 65 to 80 mole percent of a second monomer. The weight average molecular weight of the oligomer is 330 to 2000, preferably about 560 to 600.

The invention also relates to a novel method for producing the fluorescent pigments which method is referred to herein as the "bulk two-step method."

DETAILED DESCRIPTION OF THE INVENTION

The present invention provides a non-formaldehyde fluorescent pigment which is useful to color plastics, particularly flexible plastics, along with organic solvent based systems such as, for example, inks. The fluorescent pigments are less preferred in water based systems. The fluorescent pigment is solvent resistant, that is the pigment will not dissolve or swell and the dye will not significantly bleed in a variety of solvents, including esters such as ethyl acetate, isopropyl acetate, also ketones such as acetone, methyl ethyl ketone, and highly polar solvents such as dimethylformamide. Thus the pigment is useful in a variety of coatings and paints, particularly those containing such solvents. Moreover, the pigment does not bleed in plastics, particularly flexible plastics, that is, plastics containing plasticizer.

The preferred embodiments the pigment possess increased water resistance due to the presence of the optional water insoluble resin. The fluorescent pigment is particularly useful in flexible plastics, organic solvent systems and inks, especially vinyl ink.

The fluorescent pigment is stable in products such as inks, there is no gain in viscosity and no color shift, that is, the color remains the same. Indeed, the fluorescent pigment has good color stability even at elevated temperatures, for example even above 260° C. The fluorescent pigment when used in plastic demonstrates little or no plate out and, since the fluorescent pigment lacks formaldehyde, there is no formaldehyde out-gassing. Thus, the fluorescent pigment is useful in plastics such as, for example high density polyethylene, low density polyethylene, and styrene. The fluorescent pigment has a degradation point of less than 250° C.

The invention also relates to a novel method for producing the fluorescent pigments which method is referred to herein as the "bulk two-step method." About two to three times the solids percent, that is up to about to 60 to 80 solids percent, is achievable with the novel bulk two step method as compared to conventional dispersion techniques. Moreover, a filtration step, which is necessary with conventional dispersion methods, is not needed with the bulk two step method.

The Polymer Matrix

The polymer matrix has the general formula:

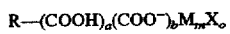

where:

R has from 18 to 100 carbon atoms, preferably 25 to 50 carbon atoms; and contains ester linkages or amide linkages, or both;

a is a number from 0 to 6, preferably from 0 to 2;

b is a number from 2 to 8, preferably from 2 to 4, wherein a+b is a number from 2 to 8;

m is a number from 0.5 to 6, preferably from 1 to 2;

o is a number from 0 to 3, preferably 0.5 to 1;

M is the metal;

X is the water insoluble resin.

The group R—(COOH)$_a$(COO$^-$)$_b$ is the oligomer which has a weight average molecular weight of from about 330 to 2000, preferably from about 330 to 1000, more preferably about 600; and a carboxylic acid equivalent weight of from about 80 to 1000, preferably from about 120 to 400. The polymer matrix embodiment which contains the water insoluble resin has a molecular weight of greater than about 330, preferably greater than about 1000. Polymer matrix embodiments which lack the water insoluble resin, have a molecular weight greater than about 330, preferably greater than about 500.

The polymer matrix contains from about 15 to 50 mole percent, preferably from about 30 to 40 mole percent, of the oligomer, from about 50 to 80 mole percent, preferably 50 to 60 mole percent, of a metal, and from about 0 to 40 mole percent, preferably about 1 to 40 mole percent, more preferably from 1 to 30 mole percent, most preferably from about 3 to 10 mole percent of a water insoluble resin.

The oligomer comprises polymerized units of from about 25 to about 66 mole percent of a first monomer, about 10 to 40 mole percent of second monomer. The weight average molecular weight of the oligomer is about 330 to 2000, preferably about 330 to 1000, more preferably about 600.

The fluorescent pigment, more specifically, the oligomer, contains amide linkages or ester linkages or both. An amide linkage is formed from the condensation reaction between a carboxylic acid group on one monomer molecule and an amine group on an adjacent monomer molecule. The ester linkages are formed by the condensation reaction between a carboxylic acid group on one monomer molecule and an alcohol group on an adjacent monomer molecule. In certain embodiments amide but no ester linkages are present; such pigments are "amide" pigments. In certain embodiments ester but no amide linkages are present; such pigments are "ester" pigments. Where the pigment contains both ester and amide linkages it is referred to as a "polyamide-ester" pigment.

The Monomers

Monomers containing carboxyl groups used to create amide linkages and ester linkages include dicarboxylic acids, polyfunctional carboxylic acids, carboxyl-alcohols, and carboxyamines. Monomers used as a source of alcohol groups used to create ester linkages include alkanolamines, carboxyl-alcohols, difunctional alcohols, and polyfunctional alcohols. Monomers used as a source of amine groups to create the amide linkages include: diamines, polyfunctional amines, carboxyl-amines, and alkanolamines. The pigments of the present invention contain a first monomer an aromatic carboxylic acid and a second monomer containing at least one amine group or one alcohol. A molar excess of carboxylic acid groups or the anhydrides esters or acid chlorides, thereof, to the alcohol and amine groups is necessary to provide residual carboxylic acid groups with which the metal ions can complex. The molar ratio of carboxylic acid groups to the alcohol and amine groups is 1.1:1.0 to 5:1, preferably from 1.2:1.0 to 4:1.0.

The First Monomer: the Aromatic Carboxylic Acid Monomers

The aromatic carboxylic acid monomer is a carboxylic acid or ester or anhydride or acid chloride thereof. As used herein, the term "aromatic carboxylic acid monomer" includes not only carboxylic acids but also the ester, anhydride and acid chloride derivatives thereof, unless otherwise noted. The aromatic carboxylic acid monomer has at least two carboxylic acid groups and has the following formula:

HOOC—R'—COOH where R' is a mono-cyclic or bicyclic arylene group of from 6 to 10 carbon atoms optionally having up to six ring substitutions which may be the same or different, selected from the group consisting of C$_1$–C$_5$ alkyl groups. Preferably, the aromatic carboxylic acid monomer has 6 to 24, preferably 8 to 17 carbon atoms. Aromatic carboxylic anhydrides are preferred.

Representative aromatic carboxylic acid monomers include, for example, phthalic acid, 2,6-naphthalene dicarboxylic acid, phthalic anhydride, trimellitic anhydride, benzophenone tetracarboxylic acid dianhydride, pyromellitic anhydride, isophthalic acid, terephthalic acid, trimellitic acid. Also suitable are the alkyl esters of the aforementioned carboxylic acids, including for example, dimethyl phthalate and dimethylterephthalate. Mixtures of aromatic carboxylic acid monomers are also suitable.

The Second Monomer

The Diamine Monomers

The diamine monomers are the preferred monomer for the source of amine groups. The diamine monomers have the general formula:

H$_2$N—R"—NH$_2$ wherein R" is a straight or branched chain alkylene group of from 2 to 20 carbon atoms, or a cycloalkylene group of from 5 to 6 carbon atoms optionally having up to three ring substitutions which may be the same or different, such substitution groups selected from the group consisting of C$_1$–C$_5$ alkyl groups.

Representative diamine monomers include, for example, ethylenediamine, 1-amino-3-aminomethyl-3,5,5-trimethyl cyclohexane, (also referred to herein as isophoronediamine), hexamethylenediamine, 1,12-dodecanediamine, 2-methylpentamethylenediamine, 2-ethyltetramethylenediamine, 1,2-diaminocyclohexane, 1,3-diaminocyclohexane, cis 1,4-diaminocyclohexane, piperazine, 2methyl-1,5-diamino pentane and trans 1,4-diaminocyclohexane. The isophoronediamine and 2-methylpentamethylenediamine are preferred. Mixtures of diamine monomers are also suitable.

The Polyamine Monomers

The polyamine monomers typically have the same general structure as the diamine monomers, but contain at least one additional amine group. Representative polyamine monomers include, for example, diethylene triamine and triethylene tetraamine. Mixtures of polyamines are also suitable.

The Carboxyl-Amine Monomers

The carboxyamine monomers contain at least one amine group and at least one carboxylic acid group. Carboxyamine monomers include, for example, p-aminobenzoic acid, and lactams, such as caprolactame. Mixtures of carboxyamine monomers are also suitable.

The Alkanolamine Monomers

The alkanolamine monomers have the general formula:

OH—R'''—NH$_2$ wherein R''' is a straight or branched chain alkylene group having 2 to 8 carbon atoms. Representative alkanolamine monomers include ethanolamine, butanolamine, n-propanolamine, and isopropanolamine. Secondary amino alcohols are also suitable; representative secondary alcohols include, for example, diethanolamine, and diisopropanol amine. Monoethanolamine and monoisopropanolamine are preferred. Mixtures of alkanolamine monomers are also suitable.

The Polyfunctional Alkanolamine Monomers

The polyfunctional alkanolamine monomers have the same general structure as the alkanolamine monomers, but contain at least one additional functional group such as an amine group or alcohol group or carboxylic acid group. Mixtures of alkanolamine monomers are also suitable.

The Difunctional Alcohol Monomers

The difunctional alcohol monomers have the general formula:

$$HO-R''''-OH$$

wherein R'''' is: a straight or branched chain alkylene group having 2 to 20 carbon atoms; a cycloalkylene group having 5 to 6 carbon atoms and optionally having up to three ring substitutions, which may be the same or different, said ring substitution groups containing alkyl groups having 1 to 5 carbon atoms.

Representative difunctional alcohol monomers include, for example: cyclohexandimethanol, ethylene glycol and propylene glycol. Mixtures of difunctional alcohol monomers are also suitable.

The Polyfunctional Alcohol Monomers

The polyfunctional alcohol monomers have the same general structure as the difunctional alcohol monomers, but contain at least one additional alcohol group. Mixtures of polyfunctional alcohol monomers are also suitable. Illustrative polyhydric alcohol monomers include, for example, glycerol, tris(2-hydroxyethyl)isocyanurate trimethylolpropane, pentaerythritol available from Celanese, and dipentaerythritol.

The Carboxyl-Alcohol Monomers

The carboxyl alcohol monomers have the general formula:

$$HO-R''''-COOH$$

wherein R'''' is: a straight or branched chain alkylene group having 2 to 20 carbon atoms; a cycloalkylene group having 5 to 6 carbon atoms and optionally having up to three ring substitutions, which may be the same or different, said ring substitution groups containing alkyl groups having 1 to 5 carbon atoms.

The carboxyl-alcohol monomers contain at least one carboxyl group and at least one alcohol. The carboxyl-alcohol monomers include, for example, p-hydroxybenzoic acid, 2-chloro-4-hydroxybenzoic acid and salicylic acid, and caprolactone.

Optional Monomers

Optionally the oligomer contains polymerized units of a dicarboxylic acid monomer which is: a dicarboxylic acid or ester or anhydride or acid chloride derivative thereof; or a polyfunctional carboxylic acid or ester or anhydride or acid chloride derivative thereof. The dicarboxylic acid monomer has the general formula:

$$HOOC-R'''-COOH$$

wherein R''' is: a non-aromatic, straight or branched chain alkylene group of from 0 to 20 carbon atoms; a cycloalkylene group of from 5 to 6 carbon atoms optionally having up to three ring substitutions, which may be the same or different, such substitution groups selected from the group consisting of $C_1-C_5$ alkyl groups.

Representative dicarboxylic acid monomers or ester or anhydride derivatives include, for example, succinic acid, succinic anhydride, glutaric acid, adipic acid, azelaic acid, sebacic acid, decanedioic acid, dodecanedioic acid, glutaric acid, cyclohexane dicarboxylic acid, dimethyladipate, dimethylglutarate, maleic acid, maleic anhydride, diethyloxalate and dimethylsuccinate. Mixtures of dicarboxylic acid monomers are also suitable.

The polyfunctional carboxylic acid monomers have the same general structure as the dicarboxylic acid monomers, but contain at least one additional carboxylic acid group. Mixtures of carboxylic acid monomers are also suitable.

The oligomer optionally contains polymerized units of an aliphatic or aromatic isocyanate monomer or mixtures thereof, particularly where the oligomer is made by the bulk two step method. The isocyanate monomer forms urethane linkages when it reacts with alcohol groups and urea linkages when it reacts with amine groups on the oligomer. Suitable isocyanates include, for example, toluene 2,4-diisocyanate, toluene 2,6-diisocyanate, isophoronediisocyante, and methylenebis(phenyl isocyanate).

The oligomer optionally contains polymerized units of an aliphatic monofunctional carboxylic or aromatic monofunctional carboxylic acid monomer or the acid chlorides, esters, or anhydrides thereof, such as for example benzoic acid, and stearic acid.

The Metal

The polymer matrix also contains metal ions which complex to at least some of the residual carboxylic acids on the oligomer to form the polymer matrix.

Divalent metals are most preferable, but trivalent metals are also suitable. Monovalent metal ions are also suitable; however, the monovalent metal ions produce fluorescent pigments having decreased water resistance and are least preferred. Magnesium and zinc ions are most preferred.

To complex the metal ion to the oligomer, metal salts are added during the preparation of the matrix. Metal salts containing labile counter ions, such as oxides, hydroxides, formates, acetates, or propionates are preferred; oxides and hydroxides are the preferred counter ion.

Suitable metal salts include for example, Group I hydroxides, Group I acetates, Group I propionates, Group II oxides, acetates, propionates, transition metal oxides, hydroxides, acetates and propionates, Group III hydroxides. The preferred oxides are the Group II oxides. The preferred metal salts are zinc and magnesium salts, most preferably zinc oxide and magnesium oxide.

Other suitable salts include for example, zinc acetate, zinc propionate, magnesium acetate, magnesium propionate, calcium oxide, calcium acetate, calcium propionate, aluminum oxide, aluminum hydroxide, sodium hydroxide, sodium acetate, sodium propionate.

The amount of metal employed depends on the quantity of free carboxylic acid groups on the oligomer. Where the metal ion has a valence of two and an average of three carboxylate groups are present on the oligomer, it is preferred that 1.5 metal ions per oligomer be employed for the fluorescent pigments. The number of moles of metal salt added to the oligomer to form the oligomer is from 50 to 200%, preferably from 75 to 100%, of the number derived from the following equation:

$$N_M = (E_c - E_a - E_o + E_i)/n_m$$

where:

$N_m$ is the number of moles metal salt;

$E_c$ is the number of equivalents carboxylic acid;

$E_a$ is the number of equivalents of amine;

$E_o$ is the number of equivalents alcohol;

$E_i$ is the equivalents of isocyanate; and $n_m$ is the oxidation state of the metal ion.

The Water Insoluble Resin

The optional water insoluble resin is a non-polar resin having a weight average molecular weight of from about 200 to 10,000, preferably about 5000, more preferably about 350 to 1200. The water insoluble resin is preferably halogenated, preferably chlorinated or brominated and preferably has at least two functional groups, either epoxy groups or carboxyl groups or a mixture thereof. The functional groups on the water insoluble resin react with either the functional groups on the oligomer and/or with the metal ion of the polymer matrix. The water insoluble resin preferably has more than two functional groups, has a melting point below 100° C. The water insoluble resin forms ionic bonds with the metal ions of the polymer matrix. The water insoluble resin also is believed to react with the oligomer by condensation of the functional on the water insoluble resin, to the carboxylic acid groups or anhydrides thereof, on the oligomer. The water insoluble resin enhances the water resistance of the pigment. If the water insoluble resin is not present in the polymer matrix of the fluorescent pigment, the pigment is still suitable to color vinyl; however, the pigment tends to absorb water. Preferable water insoluble resins include carboxylic acid resins and epoxy resins such as for example, bisphenol A based epoxies and epoxy novolacs.

The carboxylic acid water insoluble resins have a molecular weight of from about 600 to 10,000, preferably from about 1,000 to 4,000 and an acid number of from about 100 to 300. Suitable carboxylic acid water insoluble resins include, for example, acrylic resins, styrenated acrylic resins and styrene-maleic resins having acid numbers from about 100 to 300, preferably from about 200 to 300. Also suitable are polyester resins preferably having a molecular weight from about 800 to 1,500 and an acid number from about 150 to 300, preferably from 220 to 300.

Preferably, the water insoluble resins with epoxy functional groups have a number average molecular weight of from about 200 to about 8000, more preferably about 400 to about 1000, and epoxy equivalent of from about 75 to about 1000, more preferably about 190 to about 450, and an average epoxy functionality of from about 1 to about 6, more preferably about 2 to about 4.

Preferably, the water insoluble resins with epoxy functional groups have a number average molecular weight of from about 200 to about 8000, more preferably about 400 to about 1000, and epoxy equivalent of from about 75 to about 1000, more preferably about 190 to about 450, and an average epoxy functionality of from about 1 to about 6, more preferably about 2 to about 4.

A preferred water insoluble resin is an epoxy novolac resin having a number average molecular weight of about 640, an epoxy equivalent of 176 to 181, an average epoxy functionality of 3.6. Another preferred water insoluble resin is an epoxy novolac resin having a number of average molecular weight of about 1270, an epoxy equivalent of 235, an average epoxy functionality of 4.4.

Where the water insoluble resin is employed, a conventional epoxy accelerator such as, for example, N,N-dimethyloctylamine is preferably used to prepare the polymer matrix.

When the fluorescent pigment is prepared by the bulk two step process, a water insoluble resin is selected that is dispersable in the aqueous oligomeric solution. A water insoluble resin is less preferred for pigments made according to the suspension technique.

Fluorescent Dyes

The fluorescent dyes used in this composition are conventional dyes and include, for example, fluorescent organic dyes which are brilliantly fluorescent when in solution. These daylight fluorescent type dyes belong to the dye families known as rhodamines, fluoresciens, coumarins, naphthalimides, benzoxanthenes, acridines, and azos. Suitable fluorescent dyes include, for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131. The fluorescent dye comprises from about 0.05 to about 15%, preferably about 0.5–10% of the total weight of the pigment. One or more fluorescent dyes are present in the fluorescent pigment.

Preparation of the Pigment

Suspension Method

A prepolymer dispersion of the first monomer and second monomer is formed by reacting monomers in an aqueous dispersion, forming a two phase system containing excess amine or hydroxide; typically this is accomplished using diisocyanates to form polyurethane or polyureas, dispersed in water. The dispersion is then cured with anhydride and metal oxide. The resulting pigment dispersion is water insoluble. The pigment is filtered from the water, oven-dried and ground to the desired particle size, to break up agglomerates. The preferred pigment particle size for use in vinyl is less than 20 microns, preferably a mean size of 1–5 microns. The advantage to this method is that particles are formed during dispersion and smaller median particle sizes with higher crosslink densities can be achieved than by mechanical grinding methods.

Novel Bulk Two-Step Method

The bulk method is a novel process which comprises first forming an oligomer in an aqueous solution, preferably at a temperature 70° to 130° C., more preferably 90° to 110° C. by combining the first monomer and second monomer with water preferably at about 30 to 90% solids. The monomers are reacted for a time sufficient for the exotherm to subside, preferably less than about 10 minutes. Alternatively, a premade oligomer is added to water and thoroughly mixed. When no amine monomers are used, then the first and second monomers are reacted preferably at about 110° to 200° C. for a time sufficient to effect esterification, preferably about 15 to 90 minutes.

Next, the metal salt is added and, optionally, the water insoluble resin is added and dispersed in the aqueous solution. The fluorescent dye may be added any time, except if monomers contain amine it is preferred that the dye be added after the oligomer is formed. The water insoluble resin preferably has a melt point below 100° C. The water solubility of the water insoluble resin is optionally enhanced by adjustment of pH or addition of cosolvents. The dyed prepolymer solution-dispersion mixture has the advantage of being liquid rather than solid and is easily handled; conventional techniques produce a pigment that solidifies and is difficult to remove from vessels. The dyed prepolymer solution-dispersion mixture is preferably then cast into a film prior to curing to expose surface area to air. The dyed prepolymer solution-dispersion mixture is then cured, at a temperature and for a time sufficient to drive off the water, preferably in an external vessel. Preferably the cure is accomplished at a temperature of preferably about 100° to about 250° C., more preferably 100° to about 150° C. and in about 3 to about 150 minutes, more preferably about 3 to about 10 minutes.

The cure removes the water from the reaction and causes the water insoluble resin, when employed, to bind to the oligomer. Preferably the cure is accomplished by a conventional curing techniques including, for example, forced air oven heating, microwave heating, radio frequency drying, or infrared heating, until the water is driven off so that preferably less than 1% remains. Preferably, the cure is accomplished in conventional ovens at 160° C.; in a microwave ovens of 100 wattage at "100%" power; or in a radio frequency drying unit at 8 Mhz. The resultant pigment is ground to the desired particle size. The bulk two step method is the preferred method of manufacture of the fluorescent pigments of the present invention, and is also useful for making other pigments.

EXAMPLES

The following examples are illustrative and are not intended to limit the scope of the invention.
Pigments Made by the Bulk Two Step Process

Example 1

A reaction vessel equipped with an agitator and heat source was charged with 202 g of trimellitic anhydride and 100 g water. Next, 51 g of zinc oxide was dispersed in 89 g of isophorone diamine in a separate container and slowly added to the trimellitic anhydride/water mixture. The temperature of the batch slowly rose to 100° C. and the batch began to reflux. Then 9 g of Basic Yellow 40, 0.45 g of Basic Violet 11 and 1.5 g of Basic Red 1 were added to the batch under continued agitation. After 5 minutes, the batch was dumped and cured at 180° C. in a convection oven, then ground to a 5 grind on a Hegman gauge. The resultant pigment was orange, had a melt point in excess of 290° C.

Example 2

To a reaction vessel equipped as in Example 1, 68 g piperazine was added to 192 g trimellitic anhydride and 100 g water. After the reaction subsided, 40 g magnesium oxide was slowly added to the vessel. A strong reflux was observed during the addition. 4 g Basic Yellow 40 was added to the batch. The batch was dumped and cured in an oven at 170° C. for 1 hour. The resultant pigment was yellow.

Example 3

A resin was prepared in Example 1 except that the material was cured slowly by pouring the hot preresin with hot agitation onto 480 g diisooctylphthalate at a temperature above 140° C. The resultant dispersion was then wet milled to achieve a dispersion containing approximately 40% pigment solids with a mean particle size of about 5 microns.

Example 4

80 g water, 69.1 g tris(2-hydroxyethyl)isocyanurate, 69.1 g isophronediamine, 12.6 g magnesium oxide and 25.2 g zinc oxide were charged to reactor equipped as in Example 1. 156 g phthalic anhydride was added to the reaction over a period of 10 minutes. The temperature of the reaction rose to 100° C. 11.9 g Acid Yellow 184, 0.66 g Basic Red 1, and 0.26 g Basic Violet 10 were then added to the solution. The solution was then cured in an oven at 170° C. for one hour. The resulting pigment was orange.

Example 5

To a reaction vessel equipped with an agitator, 58.4 g of isophrone diamine and 50 g of water were added. Under agitation, 20.6 g of isophorone diisocyanate was added over ten minutes at 35° C. After an exotherm subsided, 10 g of magnesium oxide was added to the reaction. 74 g of phthalic anhydride was added and the reaction allowed to exotherm to a reflux. 1.0 g of Basic Violet 10 was finally added to the reaction. The solution was oven cured at 185° C. for 1 hour to produce a pink pigment.
Pigments Made by the Suspension Method

Example 6

To a reaction vessel equipped with an agitator and heat source was charged 180 g of water and 22 g of 2-methyl-1,5-diaminopentane from Dytek A. In a separate container 27.5 g of isophorone-diisocyanate and 0.75 g of Basic Violet 10 were mixed. The isophorone-diisocyanate Basic Violet 10 mixture was added to the aqueous amine solution at 30° C. over a period of 10 minutes. 1.0 g of triethylamine was then added to the reaction. 5.0 g of magnesium oxide was added to the vessel, 18.5 g of phthalic anhydride. The reaction exothermed to 47° C. forming a pigment dispersion. The vessel was then heated to boiling to drive the reaction to completion. The pigment was filtered and washed with water and acetone to produce a pink pigment.
Pigments Made by the Bulk Two Step Method

Example 7

42.5 g isophronediamine, 17 g pentaerythritol, 37.4 g zinc oxide, 10.4 g magnesium oxide, and 60 g of water were charged to a reaction vessel equipped with a heat source and an agitator. 74 g of phthalic anhydride and 96 g trimellitic anhydride were then added and the reaction was allowed to exotherm to a reflux. 4.75 g of Basic Yellow 40, 1.0 g of Basic Red 1, and 0.53 g of Basic Violet 11 were then added and the reaction was cured in a 600 watt carousel microwave for 8 minutes to provide an orange pigment that did not melt below 290° C.

Example 8

A pigment was prepared as in Example 7, but no pentaerythritol was used, and 85 g of the isophronediamine was used.

Example 9

A pigment was prepared as in Example 7, but pentaerythritol was omitted, and 43.5 g of tris(2-hydroxyethyl) isocyanuric acid was used.

Example 10

A pigment was prepared as in Example 9, but 32 g of the water insoluble resin, an epoxy novolac resin having a number of average molecular weight of about 1270, an epoxy equivalent of 235, an average epoxy functionality of 4.4 resin was added during the initial charge.

Example 11

A pigment was prepared as in Example 10, but the epoxy novolac resin was omitted, and 32 g of the water insoluble resin, an epoxy novolac resin having a number average molecular weight of about 640, an epoxy equivalent of 176 to 181, an average epoxy functionality of 3.6, and 0.6 g of an epoxy accelerator were added. The resulting pigment was orange.

Example 11A

A pigment was prepared as in Example 11, except that 4.25 g Basic Yellow 40 dye was added, and Basic Red 1, and Basic Violet 11 were omitted to provide a yellow pigment.

Example 12

A pigment was prepared as in Example 11, except 2.5 g Basic Red 1 and 3.0 g Basic Violet 11 were used, and Basic Yellow 40 was omitted.

Example 13

200 g methanol and 192 g trimellitic anhydride were added to a reactor equipped with a heat source and an agitator. The mixture was heated to 50° C. for 15 minutes until the trimellitic anhydride dissolved. 85 g of isophorone diamine was slowly added to the reaction, and 55 g of zinc acetate was added to the reaction. 5.24 g of Basic Yellow 40, 1.90 g of Basic Violet 11, and 2.5 g of Basic Red 1 were added to the reaction. The solution was then heated in an oven at 160° C. for 2 hours. The resultant pigment was orange.

Example 14

40 grams of cyclohexanedimethanol was reacted with 43.5 grams of phthalic anhydride and 78.6 grams of trimellitic anhydride. The reaction was heated to 140° C. and held at that temperature for 30 minutes. This mixture was then cooled to 90° C. by addition of a solution containing 60 grams of water and 38.4 grams of isophoronediamine. To the reactor, 28 grams of zinc oxide, 6.0 grams of magnesium oxide, 3.0 grams of basic red 1, 2.0 grams of basic violet 11 and 80 grams of water were added. Then 0.2 mole equivalents of a halogenated epoxy resin and 1.0 grams of tertiary amine accelerator were added. The resulting solution was cured in a microwave oven. The resulting dried pigment was pink.

Example 15

40 grams of cyclohexanedimethanol was reacted with 74 grams of phthalic anhydride and 96 grams of trimellitic anhydride at 140° C. for 30 minutes. The reaction was cooled to 90° C. by addition of a solution containing 80 grams of water and 42.5 grams of isophorone diamine. 37.4 grams of zinc oxide, 10.4 grams of magnesium oxide, 3.5 grams of basic red 1, and 2.5 grams of basic violet 11 were then added to the reactor with 80 grams of water. Then 0.2 mole equivalents of a halogenated epoxy resin and 1.0 grams of tertiary amine accelerator was added. The resulting solution was cured in a microwave oven. The resulting dried pigment was pink.

Example 16

34 grams of pentaerythritol was reacted with 148 grams of phthalic anhydride at 120° C. for 30 minutes. A solution containing 10 grams of magnesium oxide and 20 grams of zinc oxide in 80 grams of water was added to the reactor. The resin was dyed using 4.0 grams of basic yellow 40, 1.0 gram of basic red 1 and 0.4 grams of basic violet 11. Then 0.15 mole equivalents of a halogenated epoxy resin and 1.0 gram of a tertiary amine accelerator was added. The resulting solution was cured in a microwave oven. The resulting dried pigment was orange.

Evaluation of Pigments

The pigments of Examples 1–13 were evaluated for resistance to acetone. A 10% dispersion of the pigment in acetone was made, allowed to sit at room temperature for 10 minutes, then a drop of the test sample is placed on a piece of filter paper and the liquid which separated was examined under blacklight for the presence of fluorescent dye. The results are presented in Table I.

The pigments of Examples 11, 11a, and 12 were also evaluated in: xylene, isopropyl alcohol, methyl ethyl ketone, mineral spirits, ethyl acetate, diacetone alcohol and a mixture of 50% xylene and 50% methyl ethyl ketone. 1 gram of pigment was added to 10 ml of the solvent and allowed to set for either 30 minutes at 100° F. or 7 days at 25° C. The results are presented in Table I.

The pigments of examples 11 and 13 were evaluated for resistance to dimethylformamide. The pigments were combined with dimethylformamide at room temperature and examined visually after 10 minutes. The results are presented in Table I.

The pigments of examples 1–14 were used to color polyvinylchloride film. 2.8 grams of fluorescent pigment were combined with 100 grams polyvinylchloride and processed in a 2 roll mill at front roll temperature of 340° F. and back roll temperature of 270° F. for about 5 minutes, to form a plastic film. An initial sample of about 15 grams were sheared off the mill while the remainder of the plastic remained on the mill. The samples were then pressed between 2 stainless steel plates at 7800 psi, for 10 seconds at 400° F., to provide flat even films. The films were then removed from the press and cooled. The polyvinylchloride film colored with pigment of examples 1, 4–12, and 14–15, were examined for bleed; a swatch of pigment polyvinylchloride was sandwiched between white polyvinylchloride film then the three film layers were sandwiched between glass plates, placed in 50° C. oven for 48 hours with 709.3 gram weight sandwich. The sample was viewed under daylight north and examined for color migration. The results are summarized in Table I.

TABLE I

SUMMARY OF PROPERTIES OF RESINS OF EXAMPLES 1–14

| Ex. | Acetone Resist. | Water* Resist. | Other Solvent Resist. | PVC Bleed |
|---|---|---|---|---|
| 1 | 1 | 2 | NT | none |
| 2 | 1 | 4 | NT | NT |
| 3 | NT | NT | NT | NT |
| 4 | 1 | 2 | NT | none |
| 5 | 1 | 2 | NT | none |
| 6 | 1 | 1 | NT | none |
| 7 | 1 | 2 | NT | none |
| 8 | 1 | 2 | NT | none |
| 9 | 1 | 2 | NT | none |
| 10 | 1 | 2 | NT | none |
| 11 | 1 | 2 | no bleed in DMF, xylene, isopropyl alcohol, methyl ethyl ketone, mineral spirits, ethyl acetate, diacetone alcohol and a mixture of 50% xylene and 50% methyl ethyl ketone. | none |
| 11a | 1 | 2 | no bleed in DMF, xylene, isopropyl alcohol, methyl ethyl ketone, mineral spirits, ethyl acetate, diacetone alcohol and a mixture of 50% xylene and 50% methyl ethyl ketone. | none |
| 12 | 1 | 1 | no bleed in DMF, xylene, isopropyl alcohol, methyl ethyl ketone, mineral spirits, ethyl acetate, diacetone alcohol and a mixture of 50% xylene and 50% methyl ethyl ketone. | none |

TABLE I-continued

SUMMARY OF PROPERTIES OF RESINS OF EXAMPLES 1-14

| Ex. | Acetone Resist. | Water[a] Resist. | Other Solvent Resist. | PVC Bleed |
|---|---|---|---|---|
| 13 | 1 | NT | NT | none in plastisol |
| 14 | 1 | 1 | NT | none |
| 15 | 1 | 1 | NT | none |
| 16 | 1 | 2 | NT | NT |

NT - not tested
a - resistance to bleed in water or acetone:
1 - no dye bleed
2 - bleeding of dye
3 - particles agglomerate
4 - particles dissolve As can be seen from Table I, the pigments of Examples 1–16 are resistant to acetone. Acetone resistance is the ability of the pigment to maintain a discrete particle and not to leach dye into the acetone. The pigments of Examples 1 to 16 do not bleed dye nor do they agglomerate or dissolve. The pigments of examples 1 to 16 also outperform conventional pigments. For example, GT-14 pigment, a conventional formaldehyde based pigment, has a 2 rating in acetone. The resistance to bleed in water varied among the pigments of Examples 1–15. Accordingly, the pigments are preferred for use in organic solvent systems which have little or no water, and in plastics. No bleeding was observed in the xylene, isopropyl alcohol, methyl ethyl ketone, mineral spirits, ethyl acetate, diacetone alcohol and a mixture of 50% xylene and 50% methyl ethyl ketone after the 30 minute period. Even after 7 days there was no bleeding in white spirit, xylene or ethyl acetate. After 7 days there was very slight bleeding in other solvents, but less than with conventional formaldehyde pigments.

The pigments of Examples 11, 11a, 12 were also added to polyvinylchloride at high pigment concentrations; 20 parts pigment were combined with 52 parts polyvinylchloride, 3 parts of the plasticizer, dioctylphthalate and 2 parts stabilizer. The dry blend was processed on a 2 roll mill at 175° C. for 60 minutes, to form colored polyvinylchloride films or foils. The plastic did not stick to the rolls during processing. The pigments did not change color or degrade during the 60 minute cycle. The "foils" obtained above were then covered with a white polyvinylchloride foil, pressed on a press at 10,000 psi at a starting temperature of 200° F. The press was cooled over night to 25° C. There was minimal bleeding; significantly less than occurs with conventional formaldehyde pigments.

The pigment of Example 12 was evaluated for plateout during injection molding. The pigment was combined with high density polyethylene to a pigment concentration of 1%. Next, 3000 g of the colored HDPE samples were run through on injection mold running at 450° F. No plateout was evident on the interior of the mold.

The 3 g of the pigments of Examples 1 and 13 were combined with 97 g of a vinyl plastisol formulation, drawn down on Chromecoat coated stock paper to a thickness of about 6 mils, then cured at 180° C. to provide a vinyl film. The pigments were examined for dye bleed onto the chromocoat surface. Neither of the samples displayed bleeding.

The pigments of Examples 1, and 4 to 12 were also evaluated for color and heat stability in polyvinylchloride. Samples of polyvinylchloride film colored with the pigments of Examples 1, and 4 to 12 were combined with powdered Pantasote Kohinor 2478, a clear plasticized vinyl, processed on the mill at 175°–180° C., to form colored films, and collected at various times. The samples were collected as the film came out of the mill, and thereafter at 15 minutes, 30 minutes and 45 minutes. These samples remained on the mill at a temperature of 180° F. The samples were compared to the sample initially collected and viewed under daylight northern illumination. There was no color loss in the samples collected at 15 and 30 minutes and less than 5% color loss in the sample collected at 45 minutes, indicating that the pigment was stable to prolonged exposure to heat.

The polyvinylchloride film sample of film colored with pigment 11A and 12 were also put into a fadometer and examined at 16 hours. The film colored with the pigments retained approximately 60% of color.

A blowpin plateout test was performed with pigment from Example 11. First, a color concentrate was made by extruding a dry mixture of 25% pigment, 75% MN-718 LDPE from Quantum Chemical through a Killion Lab extruder at 375° F. The extruded concentrate was chopped into pellets. The color concentrate was then combined with LC-73202 HDPE from Quantum Chemical at a concentration of 8%. A total of 20 lbs. of resin and concentrate was molded at 450° F. Plateout values of conventional pigments are offered for comparison. The results are shown in Table II.

TABLE II

BLOWPIN PLATEOUT RESULTS

| Resin | Plateout (mg) |
|---|---|
| unpigmented HDPE | 0.5 |
| Example 11 | 0.7 |
| conventional polyamide thermoplastic pigment | 24 |
| conventional polyamide /polyester thermoplastic pigment | 4.8 |
| conventional polyamide thermoplastic pigment | 3.9 |

The pigment of Example 11 exhibits low plate out in blow molding applications as compared to comparative conventional pigments which do not contain formaldehyde. Indeed, the plateout value for the pigment of Example 11 is similar to the plateout value for unpigmented plastic. While conventional formaldehyde based thermoset pigments exhibit less plateout than conventional non-formaldehyde pigments, they tend to outgas formaldehyde particularly at temperatures above 400° F. Thus, the pigments of the present invention demonstrate the low plateout values typical of formaldehyde pigments but without the formaldehyde outgassing.

A fluorescent vinyl screen ink was prepared by combining 40.30 parts of the pigment of Example 11, 54 parts of a clear ink base of polyvinylchloride solubilized in glycol ether acetate. The ink was then placed in an oven for one week at 50° C. Control samples of ink containing the pigment of Example 11 were left at ambient temperatures. For comparison, a conventional thermoset fluorescent pigment was also placed in the oven for one week. The ink of Example 11 had a strong clear color as compared to the conventional pigment. The viscosities were measured initially and at the end of the one week period. Samples of the ink containing the pigment of Example 11 and the conventional ink were also placed in an oven for one week at 122° F.

Initially, both the ink containing the pigment of Example 11 and the conventional thermoset ink had a viscosity of 3500 cps. However, at the end of one week in the 50° C. oven, the ink containing the pigment of Example 11 had a viscosity of 3000 cps. In contrast, the conventional ink had a viscosity of 14250 cps, a 407% increase in viscosity, which rendered it unusable. The ink containing the pigment of Example 11 was substantially less lightfast than the conventional pigment, after five hours exposure to a carbon arc lamp. After one week in the 50° C. oven, the ink containing the pigment of Example 11 displayed only a slight shift in color toward yellow as compared to the ink which remained at ambient temperature. In contrast, the conventional ink which was heated to 50° C. for one week displayed a substantial shift toward yellow when compared to the conventional ink which remained in ambient temperature. The ink containing the pigment of Example 11 which was heated for one week at 122° F. was stable and displayed only a slight soft settle. In contrast, the conventional ink had small lumps throughout the batch, which indicated swelling of the pigment particles.

While the pigments disclosed herein are useful to color and coat, rigid vinyl, flexible vinyl, A type and C type gravure inks, other plastics particularly plastics which are injection and blowmolded including for example, high density polyethylene, low density polyethylene, polystyrene, polyethyleneterephthalate, and polycarbonate; solvent based paints and coatings.

Although one embodiment of this invention has been shown and described, various adaptations and modifications can be made without departing from the scope of the invention as defined in the appended claims.

What claimed is:

1. A thermoset fluorescent pigment comprising:
   a. about 85 to 99.95 weight percent of a thermoset polymer matrix containing:
      1. 15 to 50 mole percent of a oligomer having a molecular weight of from about 330 to 2,000, a carboxylic acid equivalent weight of from about 80 to 1000, and containing amide linkages or ester linkages or both, having:
         i. about 35 to 90 mole percent of polymerized units of a first monomer, having at least two carboxylic acid groups such first monomer being an aromatic carboxylic acid having monocyclic or bicyclic arylene group, said first monomer having from 6 to 24 carbon atoms;
         wherein the ratio of carboxylic acid groups on the first monomer to combined alcohol and amine groups on the second monomer is 1.1:1.0 to 5:1;
         ii. about 10 to 65 mole percent of polymerized units of a second monomer selected for the group consisting of: alkanolamine monomers, diamine monomers, polyfunctional amine monomers, dialcohol monomers, polyfunctional alcohol monomers and carboxyl-alcohol monomers and carboxyl-amino monomers and mixtures thereof;
      2. about 30 to 80 mole percent of metal ion;
      3. about 0 to 40 weight percent of a water insoluble resin, having a number average molecular weight of about 200 to about 10,000, at least two functional groups wherein the functional groups are either epoxy groups or carboxylic acid groups or mixture thereof;
   b. about 0.05 to 15 weight percent of the total pigment weight, of fluorescent dye.

2. The fluorescent pigment of claim 1, wherein the ratio of carboxylic acid groups to amine and alcohol groups is from about 1.2:1.0 to about 4.0:1.

3. The pigment of claim characterized in that it is resistant to acetone.

4. A thermoset fluorescent pigment comprising:
   a. about 85 to 99.95 weight percent of a thermoset polymer matrix wherein the polymer matrix has the general formula:

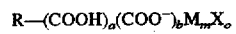

where:
   R has from 18 to 100 carbon atoms, preferably 25 to 50 carbon atoms; and contains ester linkages or amide linkages, or both;
   a is a number from 0 to 6;
   b is a number from 2 to 8, wherein a+b is a number from 2 to 8;
   m is a number from 0.5 to 6;
   o is a number from 0 to 3;
   M is a metal;
   X is a water insoluble resin having a number average molecular weight of about 200 to about 10,000, at least two functional groups wherein the functional groups are either epoxy groups or carboxyllic acid groups or mixture thereof;
   b. about 0.05 to 15 weight percent of the total pigment weight, of fluorescent dye.

5. The fluorescent pigment of claim 1, wherein the oligomer is present from about 30 to 40 mole percent, the metal is present from about 50 to 60 mole percent.

6. The fluorescent pigment of claim 1, wherein the polymer matrix contains amide linkages but not ester linkages.

7. The fluorescent pigment of claim 1, wherein the polmer matrix contains ester linkages but not amide linkages.

8. The fluorescent pigment of claim 1, wherein water insoluble resin is present from about 1 mole percent to about 40 mole and is characterized by having either: at least two epoxy groups wherein the epoxy equivalent of from about 75 to about 1000, and an average epoxy functionality of from about 1 to about 6; or at least two carboxylic acid groups wherein having acid numbers from about 100 to 300.

9. The fluorescent pigment of claim 5, wherein the first monomer is selected from the group consisting of trimellitic anhydride, phthalic anhydride and mixtures thereof and the second monomer is selected from isophoronediamine, 2-methyl-1,5-diaminopentane, and piperazine and mixtures thereof.

10. The fluorescent pigment of claim 5, wherein the second monomer is a mixture of tris(2-hydroxyethyl) isocyanurate and isophronediamine, and the first monomer is phthalic anhydride.

11. The fluorescent pigment of claim 5, wherein the second monomer is a mixture of isophronediamine and pentaerythritol, the first monomer is a mixture of phthalic anhydride and trimellitic anhydride.

12. The fluorescent pigment of claim 5, wherein the second monomer is isophronediamine, the first monomer is a mixture of phthalic anhydride and trimellitic anhydride.

13. The fluorescent pigment of claim 5, wherein the second monomer is a mixture of isophronediamine and tris(2-hydroxyethyl)isocyanuric acid, the first monomer is a mixture of phthalic anhydride and trimellitic anhydride.

14. The fluorescent pigment of claim 5, wherein the second monomer is a mixture of isophronediamine, and tris(2-hydroxyethyl)isocyanuric acid, the first monomer is a mixture of phthalic anhydride and trimellitic anhydride, and from about 1 to 40 mole percent water insoluble resin which is an epoxy resin.

15. The fluorescent pigment of claim 5, wherein the second monomer comprises isophorone diamine and the first monomer is the trimellitic anhydride.

16. The fluorescent pigment of claim 5, wherein the water insoluble resin is an epoxy resin having a number average molecular weight of from about 400 to about 1000, epoxy equivalent of from about 190 to about 450, and an average epoxy functionality of about 2 to about 4.

17. A fluorescent pigment of claim 5, wherein the first monomer is isophthalic acid, and the second monomer is 2-methyl-1,5-diamino pentane.

18. A fluorescent pigment of claim 5, wherein the first monomer is isophthalic acid, and the second monomer is monoethanolamine.

19. A fluorescent pigment of claim 5, wherein the first monomer is phthalic anhydride and trimellitic anhydride and the second monomer is a mixture of cyclohexanedimethanol and isophoronediamine and from about 1 to 40 mole percent of the water insoluble resin which is an epoxy resin.

20. A fluorescent pigment of claim 5, wherein the first monomer is phthalic anhydride, the second monomer is pentaerythritol and from about 2 to 40 mole percent of the water insoluble resin which is an epoxy resin.

21. A fluorescent pigment of claim 5, wherein the metal is magnesium or zinc.

22. The fluorescent pigment of claim 1, wherein the pigment is free of formaldehyde.

23. A vinyl plastic colored with the pigment of claim 1.

24. A vinyl ink comprising a vinyl solubilized in organic solvent and the pigment of claim 1.

25. A method of making a thermoset fluorescent pigment comprising the following steps:

a. first forming a carboxylic acid-containing-oligomer in an aqueous solution at about 30 to 90% solids, b. adding fluorescent dye to the oligomer of step a;

c. adding metal salt after step a;

d. adding 0 to 40 mole percent of a water insoluble resin after steps a;

e. forming a film of uncured pigment solution/dispersion;

f. curing the prepolymer solution-dispersion to drive off the water to provide a fluorescent pigment;

g. grinding the fluorescent pigment to the desired particle size.

26. The pigment produced according to the method of claim 25.

27. The pigment of claim 4, wherein a is a number from 0 to 2;

b is a number from 2 to 4, wherein a+b is a number from 2 to 8;

m is a number from 1 to 2;

o is a number from 0.5 to 1.

* * * * *

UNITED STATES PATENT AND TRADEMARK OFFICE
CERTIFICATE OF CORRECTION

PATENT NO. : 5,714,090
DATED : Feb. 3, 1998
INVENTOR(S) : Waters, et al.

It is certified that error appears in the above-indentified patent and that said Letters Patent is hereby corrected as shown below:

Col. 16, line 1

The number "1" should be appear after the word "claim".

Signed and Sealed this

Sixteenth Day of June, 1998

Attest:

BRUCE LEHMAN

Attesting Officer

Commissioner of Patents and Trademarks